United States Patent
Gobush et al.

[19]

[11] Patent Number: 5,803,823
[45] Date of Patent: *Sep. 8, 1998

[54] METHOD AND APPARATUS TO DETERMINE OBJECT STRIKING INSTRUMENT MOVEMENT CONDITIONS

[75] Inventors: William Gobush, North Dartmouth; Diane Pelletier, Fairhaven; Charles Days, South Dartmouth, all of Mass.

[73] Assignee: Acushnet Company, Fairhaven, Mass.

[ * ] Notice: The term of this patent shall not extend beyond the expiration date of Pat. No. 5,471,383.

[21] Appl. No.: 751,447

[22] Filed: Nov. 18, 1996

Related U.S. Application Data

[60] Continuation of Ser. No. 510,085, Aug. 1, 1995, Pat. No. 5,575,719, which is a division of Ser. No. 209,169, Feb. 24, 1994, Pat. No. 5,501,463, which is a continuation of Ser. No. 979,712, Nov. 20, 1992, abandoned.

[51] Int. Cl.⁶ .......................... A63B 69/36; G06F 51/00; H04N 7/18
[52] U.S. Cl. .......................... 473/223; 473/199; 473/222
[58] Field of Search .......................... 473/199–200, 473/219, 220, 221, 222, 223, 224, 225, 226, 140, 141; 364/410; 273/29 A, 26 R, 72 R, 73 R

[56] References Cited

U.S. PATENT DOCUMENTS

| | | |
|---|---|---|
| 3,513,707 | 5/1970 | Russel et al. . |
| 3,918,073 | 11/1975 | Henderson .............................. 473/222 |
| 4,063,259 | 12/1977 | Lynch et al. . |
| 4,136,387 | 1/1979 | Sullivan et al. . |
| 4,137,566 | 1/1979 | Haas et al. . |
| 4,158,853 | 6/1979 | Sullivan et al. . |
| 4,160,942 | 7/1979 | Lynch et al. . |
| 4,375,887 | 3/1983 | Lynch et al. . |
| 4,477,079 | 10/1984 | White . |
| 4,695,888 | 9/1987 | Peterson . |
| 4,695,891 | 9/1987 | Peterson . |
| 4,713,686 | 12/1987 | Ozaki et al. . |
| 4,858,934 | 8/1989 | Ladick et al. . |
| 5,101,268 | 3/1992 | Ohba . |
| 5,111,410 | 5/1992 | Nakayama et al. . |
| 5,210,602 | 5/1993 | Sabin . |
| 5,342,054 | 8/1994 | Chang et al. . |
| 5,471,383 | 11/1995 | Gobush et al. . |
| 5,501,463 | 3/1996 | Gobush et al. . |
| 5,575,719 | 11/1996 | Gobush et al. .......................... 473/199 |

*Primary Examiner*—Jessica Harrison
*Assistant Examiner*—Mark A. Sager
*Attorney, Agent, or Firm*—Pennie & Edmonds LLP

[57] ABSTRACT

A striking instrument and struck object monitoring system including at least two shutterable camera units which view a field of view each of which cameras receives light patterns from each and every one of a plurality of contrasting areas on the instrument and the object in rapid successive sequence. A computer receives the signals generated by the light patterns as received by each camera unit which computer discriminates between such signals to determine the instrument's movement and orientation, and the conditions at impact with the object. The striking instrument may be any selected golf club which club is initially scanned by the system to determine it's proper striking location prior to the club being swung through the field of view.

29 Claims, 7 Drawing Sheets

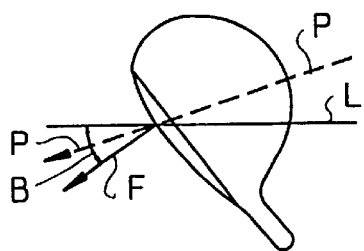
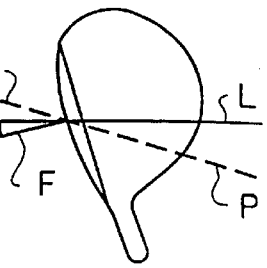
FIG. 1a    FIG. 1b    FIG. 1c
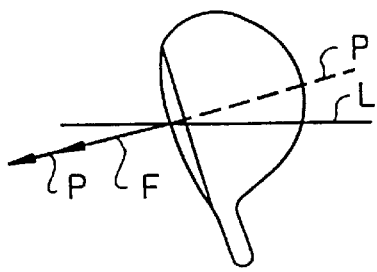
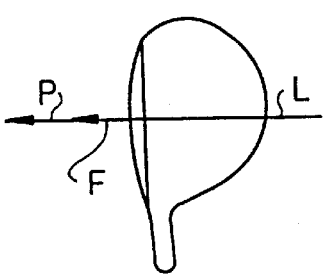
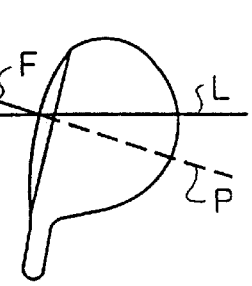
FIG. 1d    FIG. 1e    FIG. 1f
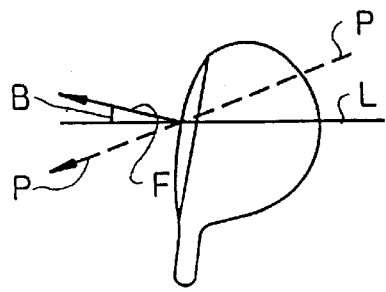
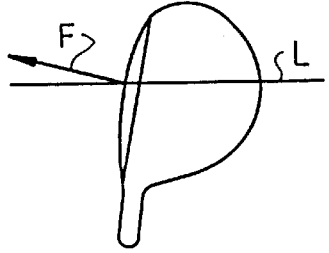
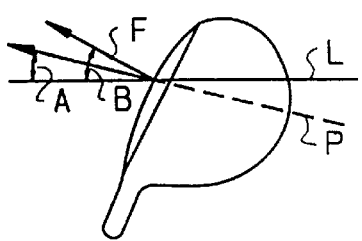
FIG. 1g    FIG. 1h    FIG. 1i

METHOD AND APPARATUS TO DETERMINE OBJECT STRIKING INSTRUMENT MOVEMENT CONDITIONS

This is a continuation of application Ser. No. 08/510,085 filed on Aug. 1, 1995, now U.S. Pat. No. 5,575,719, which is a divisional application of Ser. No. 08/209,169, filed Feb. 24, 1994, now U.S. Pat. No. 5,501,463, which is continuation of application Ser. No. 07/979,712, filed Nov. 20, 1992, now abandoned.

BACKGROUND OF THE INVENTION

Apparatus for measuring golf ball flight characteristics are old (U.S. Pat. Nos. 4,063,259; 4,375,887, 4,158,853, 4,136,387). Techniques of detecting golf clubhead position and golf ball position shortly after impact using photoelectric means to trigger a flash to permit a photograph to be taken of the clubhead has been disclosed (U.S. Pat. Nos. 4,063,259; 4,375,887). Golf ball or golf clubhead movement has been determined by placing reflective areas on a ball along with use of electro-optical is sensors (U.S. Pat. No. 4,136,387). The electro-optical sensing of light sources on both the golfer body and his club has also been disclosed (U.S. Pat. No. 4,137,566). In addition, apparatus for monitoring a golfer and the golf club being swung has also been disclosed (U.S. Pat. No. 4,137,566).

No fully satisfactory system for sensing golf club head movement just prior to and at impact has yet been proposed.

SUMMARY OF THE INVENTION

Broadly, the present invention comprises method and apparatus for measuring the speed, direction and orientation of a striking instrument such as golf club head before the point of impact of the instrument against the ball or other object to be struck and from such data computing conditions of instrument movement prior to impact.

It is a feature that the method and apparatus particularly apply to golf equipment and that the present invention provides a golfer with data relating to the variables of his swing useful in improving his swing and in selecting advantageous equipment for his use including types of clubs and balls It is also a feature that the system can be used for analyzing movement of other sports striking instruments.

BRIEF DESCRIPTION OF THE DRAWINGS

FIGS. 1(a)–(i) illustrate various golf clubhead face orientations and clubhead paths at impact;

DESCRIPTION OF THE PREFERRED EMBODIMENT

There are five (5) conditions of golf clubhead movement which determine the flight of the ball as impacted by the clubhead. They are:

1. "Clubhead speed" which affects ball speed and in turn distance (approximately 2½ yards of distance is gained for every mph of club speed).
2. "Clubhead path" measured in a horizontal plane which affects the direction the ball will travel.
3. "Clubhead attack angle" measured in a vertical plane which affects the launch angle and the backspin of a golf ball.
4. "Face orientation"
   (a) squareness measured with respect to a horizontal line perpendicular to intended line of flight which affects the hook/slice spin on the golf ball.
   (b) loft variation which affects the backspin and launch angle.
5. "Location of ball contact" on the face
   (a) up and down the face
   (b) from heel to toe.

Location of ball contact effects ball flight in that it affects launch angle and spin rate.

FIGS. 1(a)–1(i) illustrate various clubhead paths in horizontal planes and face orientations at impact. The clubhead path P is angle A measured in degrees from the intended initial line of flight of the ball $L_i$. The face orientation angle is angle B measured between the line of flight $L_i$ and clubhead face direction indicated by arrow F.

Turning in particular to FIG. 1(a), club path P is from outside-to-inside at impact producing a negative A angle and the face is closed producing a negative angle B. The result is a pull hook shot.

FIG. 1(b) shows the clubhead path P along line $L_i$ and the clubhead closed with a negative angle B which conditions produce a hook;

FIG. 1(c) shows the clubhead path P such that angle A is positive while a closed face creates a negative angle B for a push hook shot;

FIG. 1(d) shows the P and F coinciding at an angle to $L_i$ producing a pull shot;

FIG. 1(e) shows a straight flight shot;

FIG. 1(f) shows conditions that produce a push;

FIG. 1(g) whose conditions that result in a pull slice shot;

FIG. 1(h) shows the clubhead path P along the line 1, but with the club face open to produce a slice; and FIG. 1(i) shows the condition for a push slice.

Figure 2A:
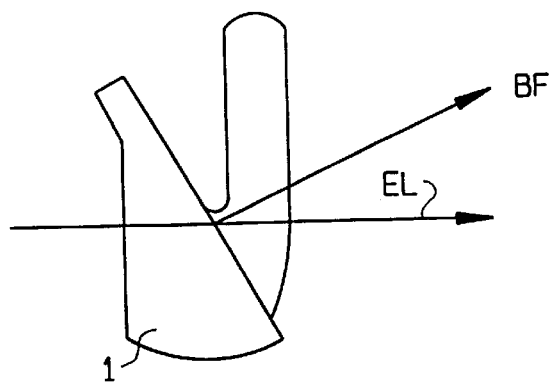
FIGS. 2(a)–(c) illustrate golf iron paths and effect on ball flight.
Figure 2B:
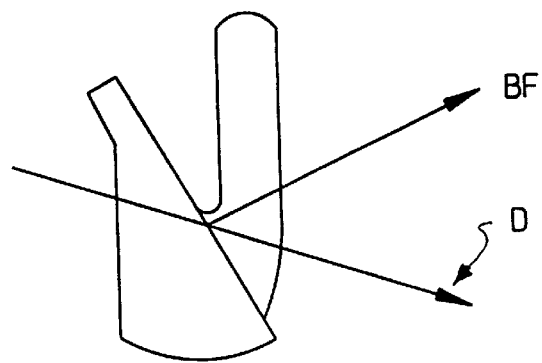
Figure 2C:
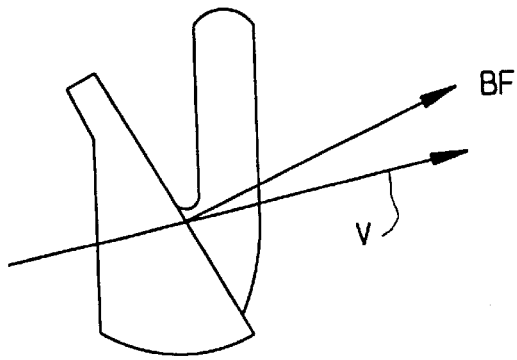

Turning now to FIGS. 2a–c, clubhead iron unit 7 is shown having a level attack angle EL; descending attack angle D; and rising attack angle U producing ball flights of BF.

Figure 3A:
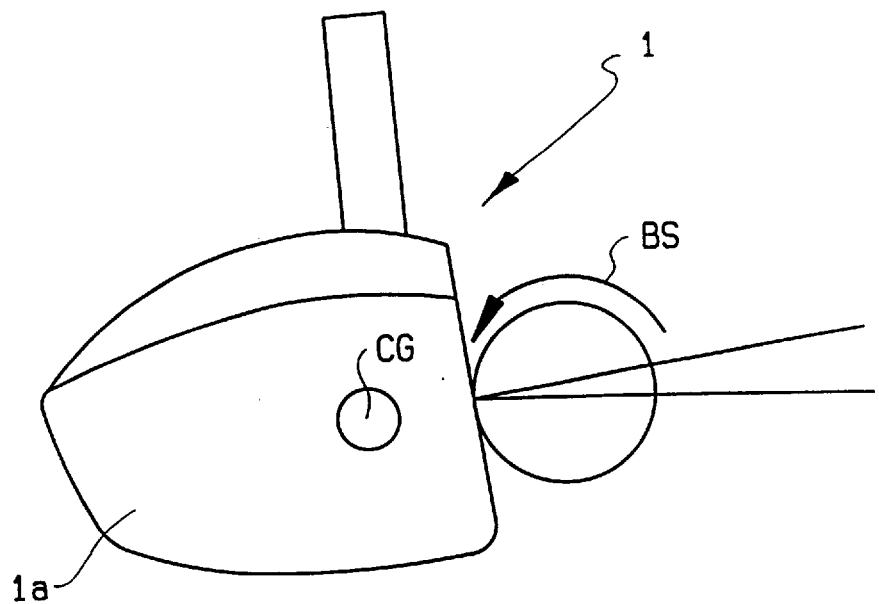
FIGS. 3(a)–(b) illustrate golf wood club head-to-ball engagement positions and resulting spin.
Figure 3B:
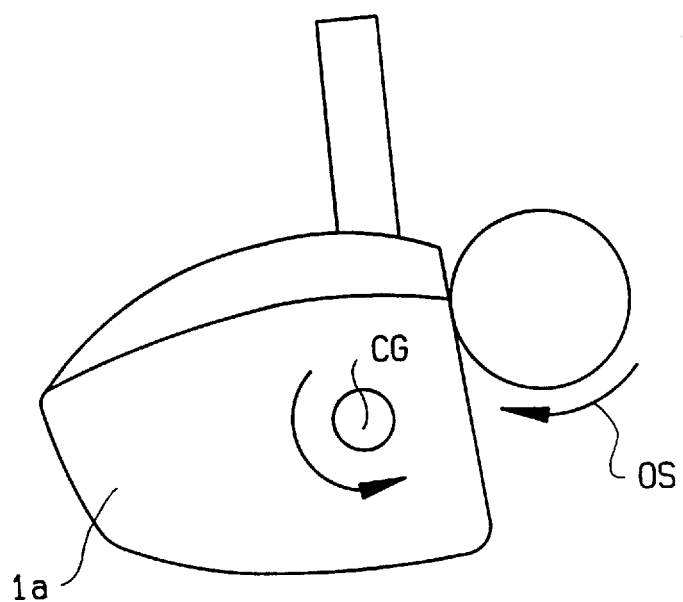
Figure 4:
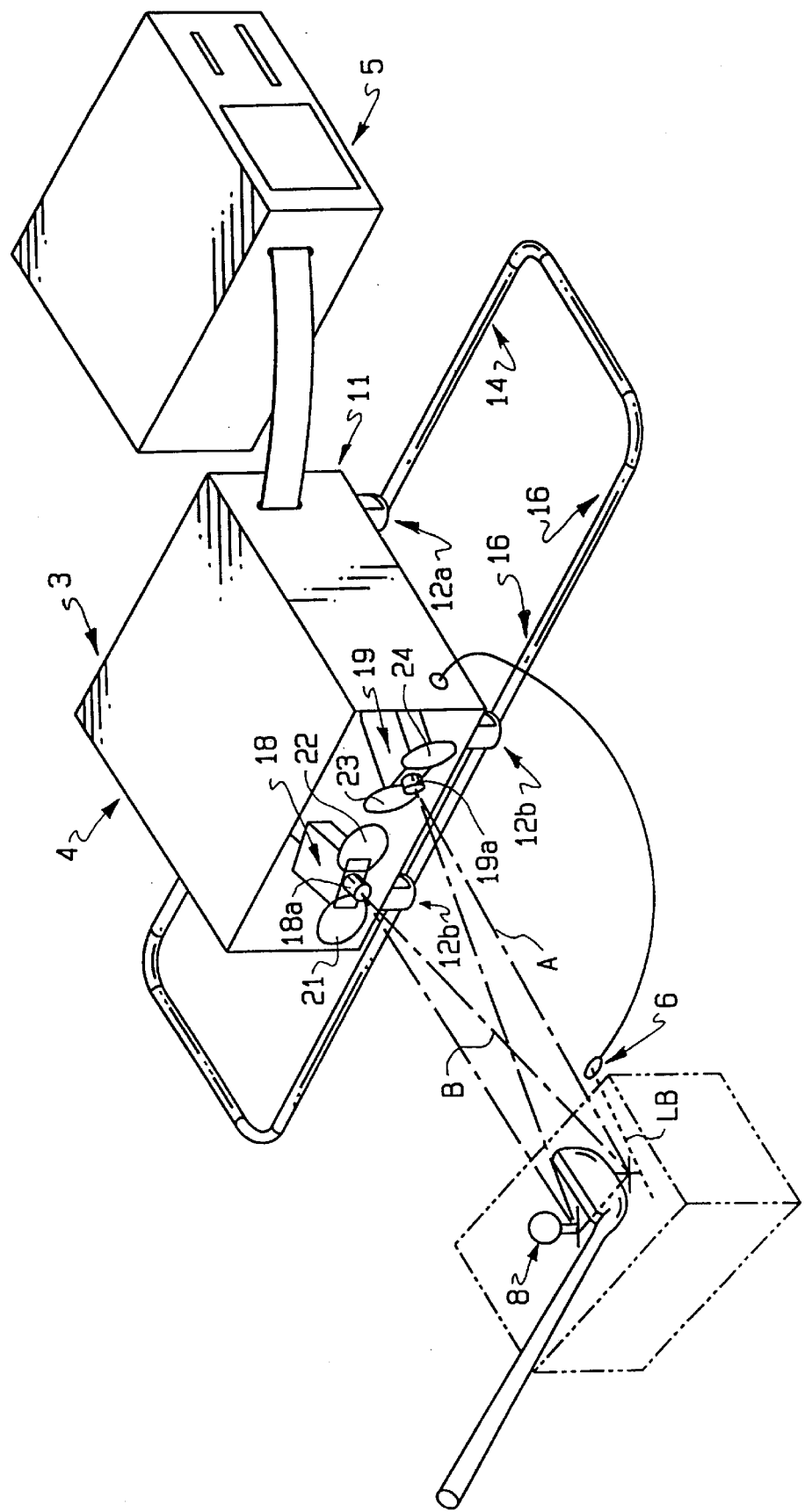
FIG. 4 is a perspective view of the apparatus of the present invention including two cameras positioned adjacent a golf club head at addressing and a teed golf ball.

In FIGS. 3a–3b, wooden club 1 produces backspin BS when striking ball 2 at the center of gravity CG of the clubhead 1a. Overspin OS is generated when the ball is struck above the CG and the clubface has zero loft angle.

Now referring to the FIGS. 4–8, system 3 includes camera housing unit 4, computer 5, sensor 6 and teed golf ball 8. Camera unit 4 includes housing frame 11 and support feet 12a, 12b engageable with tracks 14, 16 so that the unit 4 can be adjusted relative to teed ball 8. Camera unit 4 further includes two electro-optical spaced-part cameras 18, 19, which cameras have light-receiving apertures 18a, 19a, shutters (not shown) and light sensitive silicon panels 18p, 19p (see FIG. 8). CCD cameras are preferred but TV-type cameras are also useful. The angle between lines A and B on FIG. 4 may be in the range of 10°–30° with 22° being preferable.

Figure 5:
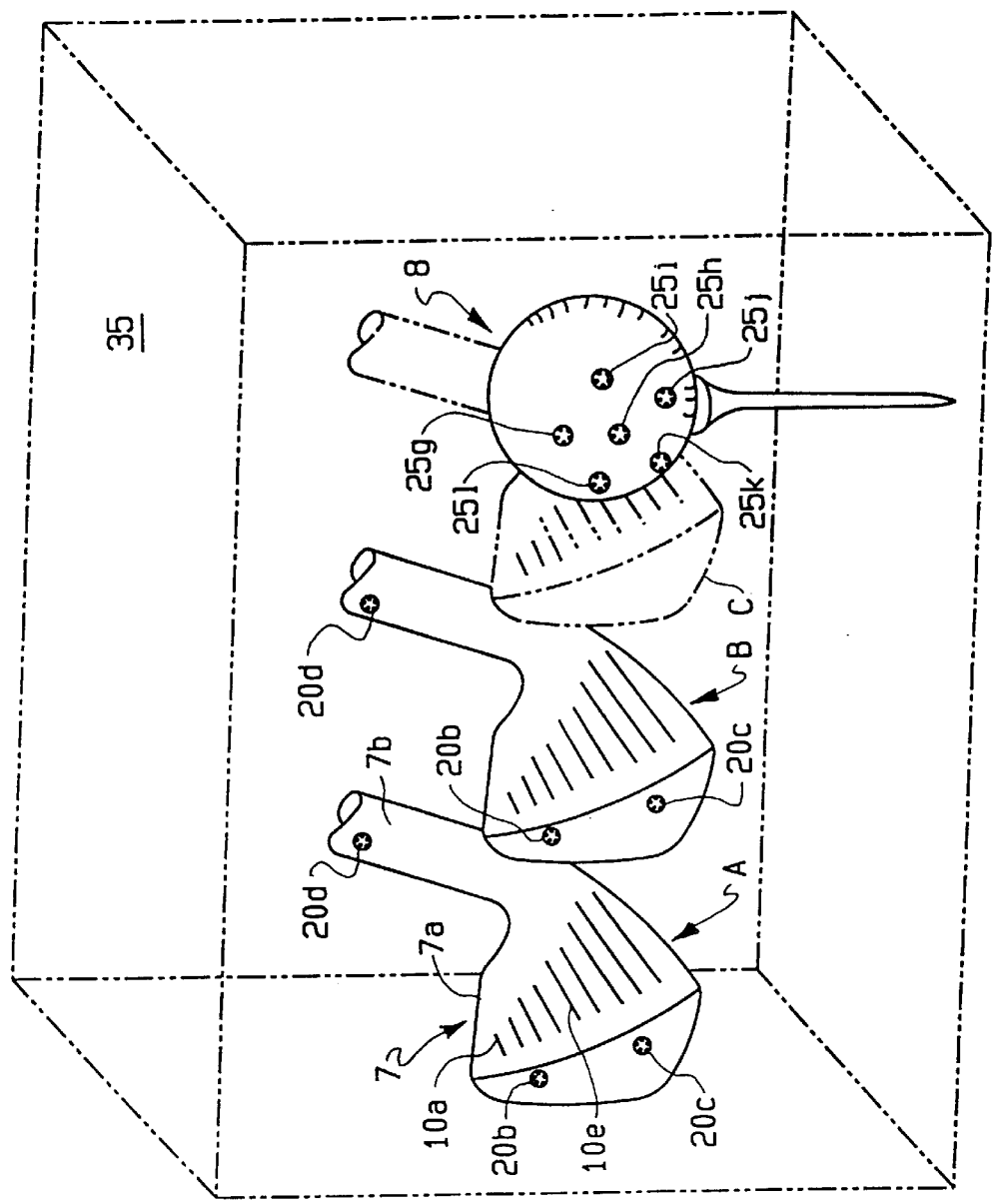
FIG. 5 is a perspective view of a three-dimensional rectilinear field showing an iron golf club head unit passing partially therethrough from measured position A to measured position B to projected impact position C.

Turning to FIG. 5, golf clubhead 7a and attached hosel 7b which together comprise clubhead unit 7 have three (3) reflective spaced-apart round areas or dots 20a–c placed thereon. Round dots 20a–c having diameters of one-tenth (1/10) to one-eighth (1/8) of an inch are preferred but other size and shaped areas can be used. Dots 20a–c are preferably made of reflective material which is adhered to the clubhead 7a and hosel 7b surface. Teed ball 8 has similar dots 25g–l. The "Scotchlite" brand beaded material made by Minnesota Mining and Manufacturing (3M) is preferred for forming the dots. Corner-reflective retroflectors may also be used. Alternatively, painted spots can be used that define contrasting areas. The number of dots or areas may be as few as three (3) up to six (6) or more of the clubhead and for the ball provided each dot or area reflects light in club positions A and B and teed ball position.

Camera 18 is capable of receiving light from each and every dot 20a–c and dots 25g–l and camera 19 is likewise capable of receiving light from each and every one of such dots.

Reflective materials as compared with the coated surface of the golf ball and metallic or wooden surfaces of golf clubs are as high as nine hundred (900) times brighter where the divergence angle between the beam of light striking the dots 20a–c and dots 25g–l the beam of light from such dots to the camera aperture is zero or close to zero. As the divergence angle increases, the ratio of brightness of such dots 20a–c and dot 25g–l to the background decreases. It will be appreciated that infra red lighting may be used to make the flash light invisible to the golfer.

Referring back to FIG. 4, adjacent to camera 18 are two flash lamps 21, 22 and adjacent to camera 19 are two additional flash lamps 23, 24. Lamps 21, 22, 23 and 24 are placed as close to the operative of camera 18, 19 as possible to minimize the divergence angle and this increases the ability of cameras 18, 19 to receive light from dots a–c and 25g–l and distinguish that light from light received from other portions of the clubhead unit 7, ball surface 8 and other background light. Alternatively, gating or shuttering can be accomplished by controlling the periods of time in which the light sensitive panels 18p, 19p will receive light and be activated by such light. A camera in which shuttering or gating is accomplished by operation of the sensor panels is a gated charge intensified camera. In this alternative, the light source is always on the camera shutters always open, thus employing the panels 18p, 19p to accomplish gating by gathering light only at a plurality of time periods separated by 800 microseconds. A second alternative utilizes a ferroelectric liquid crystal shutter which opens and closes in 100 microseconds. In this alternative, a constant light source is used and shuttering occurs twice before the ball has been hit.

Figure 6:
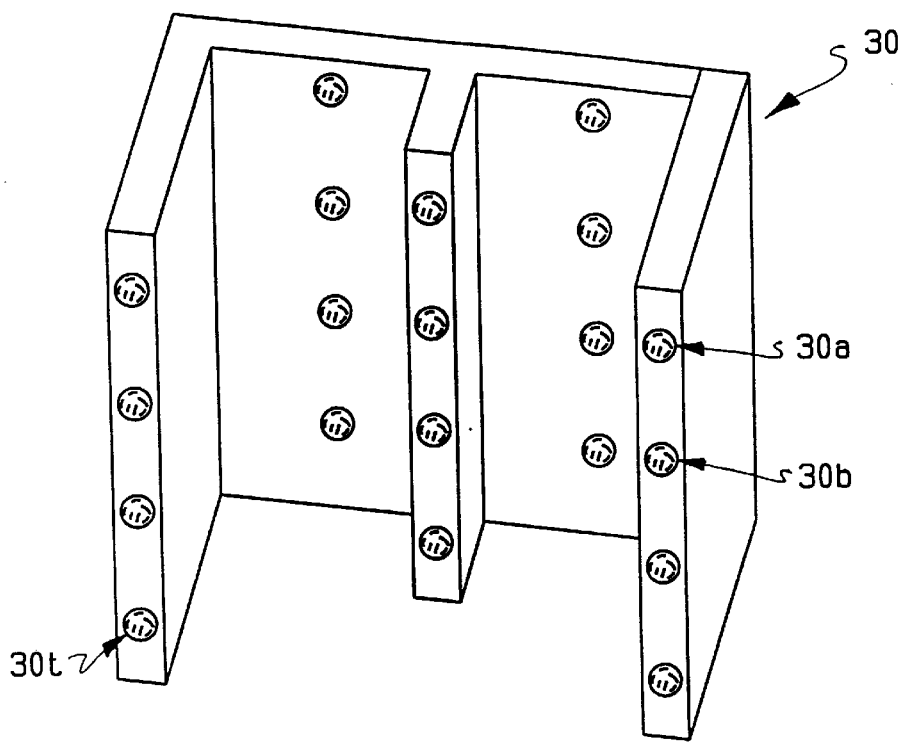
FIG. 6 is a perspective view of the calibration fixture carrying twenty illuminable areas.

In the operation of the system, the initial step is calibration of the cameras 18, 19. The cameras 18, 19 are calibrated to a coordinate system fixed in space. To accomplish this calibration, fixture 30 of FIG. 6 is physically located just behind the location where the teed ball 8 will be placed. The fixture includes twenty (20) retro-dots 30a–t of 1/4" in diameter. Fixture 30 defines the global coordinate system by its three dimensional structure. The location of fixture 30 and spacing of cameras 18, 19 from the fixture 30 or each other need not be precise since the fixture 30 locates these when it determines the eleven constants for each camera 18, 19.

Figure 7:
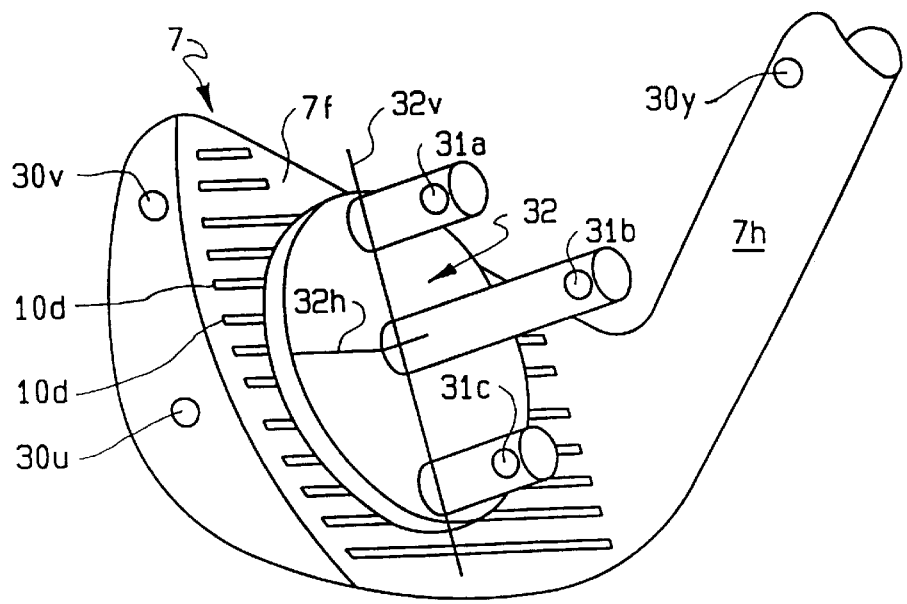
FIG. 7 is a perspective view of an attachment for providing initial golf clubhead information to the system.

Further, calibration of clubhead unit 7 is accomplished by adhering attachment 32 to club face 7f. Vertical orientation line 32v and horizontal line 32h are used to orient and locate attachment 32 on clubhead face 7f having club face grooves 10a,b etc. Line 32h is parallel to a face grooves 10a, b etc. Attachment 32 including the clubhead unit 7 attachment 32 are placed adjacent ball 8. Attachment 32 includes three (3) retro-dots 31a–c and clubhead 7a has retro-dots 20a–b with each reto-dot about 1/4" in diameter. Attachment 32 provides the system with information to locate the geometric center of face 7f which center is the proper location for ball impact. Attachment 32 forms a plane defining an axis system centered at the center of the clubface 7f (FIG. 7). By aligning the upper and lower dots on the such clubcalibration attachment 32 perpendicular to the grooves of club head 7 unit, the vector between these two points defines the x-axis of a local face coordinate system. The vector normal to the plane of the three calibration points defines the Y-axis direction and is parallel to the grooves. The normal to the x and the y axis vector defines the third rectangular direction called the z-axis which is a direction normal to the clubface 7f the system is operated by reflecting light off dot 31a–c to camera panels 18p, 19p.

From solving the unique rotational and translational relationship between the three dots 20a–c on the club head unit 7 and the three (3) dots 31a, b, c, the intended point of impact on the club (the sweet spot) can uniquely be found at any location of the swing in the field through reflective light from the dots 20a–c on the club unit 7. Attachment 32 is then removed from clubs face 7a.

The eleven constants determine the focal length, orientation and position of each camera 18, 19 given the premeasured points on fixture 30 and the twenty U and V coordinates digitized on each camera's sensor panels 18p, 19p.

Figure 8:
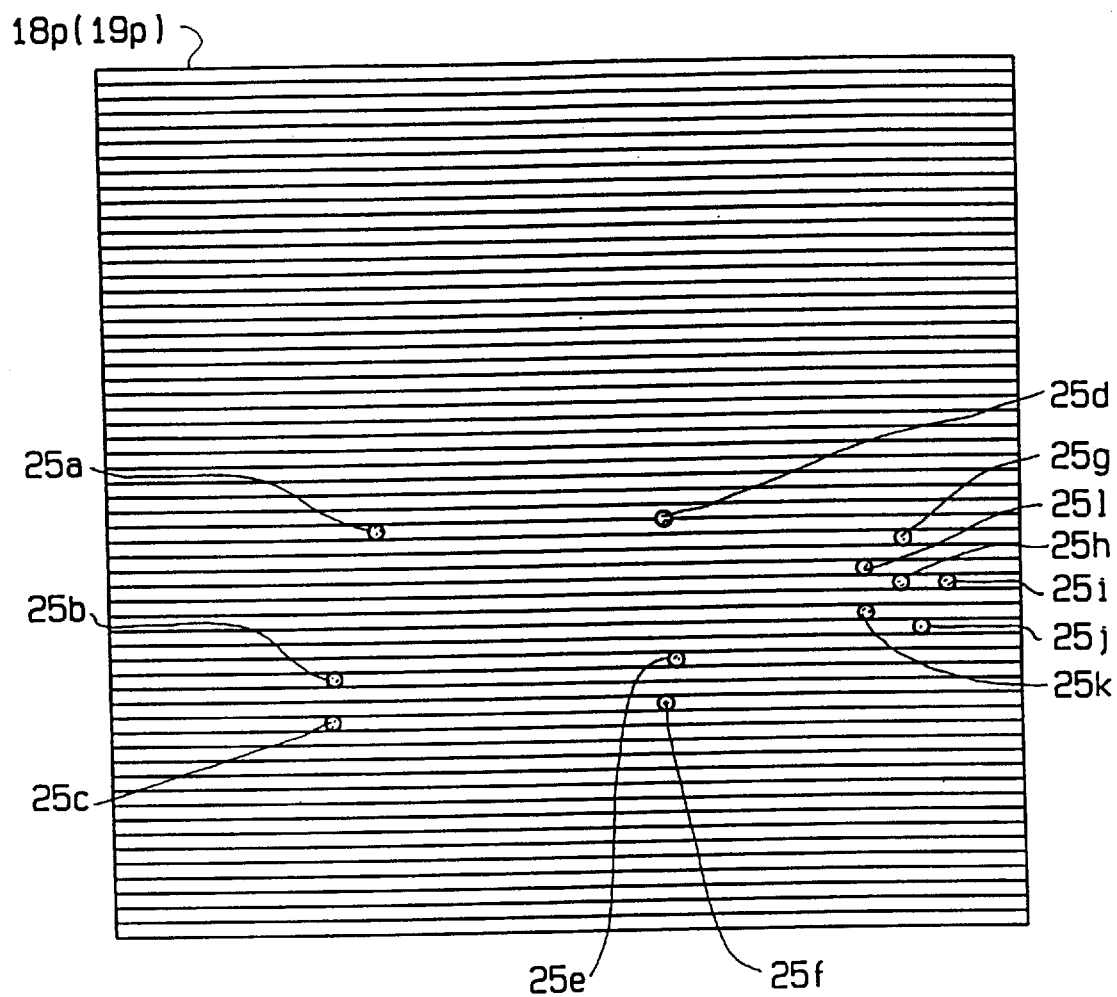
FIG. 8 is an elevational view of the light receiving and sensory grid panel located in each camera.

Sensor panels 18p, 19p which receive successive light pattern contain 240 lines of data and 510 pixels per line. The grid of FIG. 8 is merely illustrative in that it does not have 240 lines. A computer algorithm is used for centroid detection of each dot 25g–l and 20a–c. Centroid detection of a dot is the location of the center area of the dot for greater accuracy and resolution. Each image received from dots 25a–l; 20a–c results in an apparent x and y center position of each dot. Where light is low in the field of vision due to gating, an image intensifier may be used in conjunction with the sensor panels. An image intensifier is a device which produces an output image brighter than the input image.

The X, Y and Z coordinates of the center of each dot 30a–t which are arranged in a three-dimensional pattern were premeasured to accuracy of one of one-ten thousandth of an inch on a digitizing table and stored in the computer. An image of the calibration fixture 30 is taken by the two cameras 18, 19.

This image determines the eleven (11) constants relating image space coordinates U and V to the known twenty X, Y and Z positions on the calibration fixture 30. The equations relating the calibrated X(i), Y(i), Z(i) spaced points with the $U_i^{(j)}$, $V_i^{(j)}$ image points are:

$$U_i^j = \frac{D_{1j}X(i) + D_{2j}Y(i) + D_{3j}Z(i) + D_{4j}}{D_{9j}X(i) + D_{10j}Y(i) + D_{11j}Z(i) + 1}$$

$$i = 1, 20; j = 1, 2$$

$$V_i^j = \frac{D_{5j}X(i) + D_{6j}Y(i) + D_{7j}Z(i) + D_{8j}}{D_{9j}X(i) + D_{10j}Y(i) + D_{11j}Z(i) + 1}$$

The eleven constants, Di1 (i=1,11) for camera 18 and the eleven constants, Di2 (i=1,11) for camera 19 are solved from knowing X(i), Y(i), Z(i) at the 20 locations and the 20 $U_i^j$, $V_i^j$ coordinates measured in the calibration photo for the two cameras.

With calibration completed, ball 8 is teed up about 30 inches from cameras 18 and 19, club head unit 7 placed behind ball 8 at address and club head unit 7 (on a shaft not shown) is swung through three-dimensional field of view 35 (FIG. 5). About six inches before the striking of the ball, a laser beam breakage transmits a signal to open the shutter of camera 18 and camera 19 and to expose the image sensor panel in camera 18 and camera 19 to light from the three (3) club unit 7 dots 20*a–c* and six (6) stationary ball dots 25*g–l*. This illumination occurs when the club unit 7 is a position A (FIG. 5). Eight (8) hundred microseconds later, flash light 22 and light 23 fires a flash of light which again illuminates the three (3) club unit 7 dots 20*a–c* and six (6) ball dots 25*g–l*. This occurs when the club unit 7 is a position B (FIG. 5).

Flashes of light are between one-ten thousandth and a few millionths of a second in duration. Very small apertures are used in cameras 18 and 19 to reduce ambient light and enhance strobe light. As light reflects off dots 20*a–c* in their two positions, it reaches sensor panels 18*p*, 19*p* in corresponding panel areas 25*a–l* (FIG. 8). Using the known time between camera operation and the known geometric relationships between the cameras, the external computing circuits are able to calculate the X, Y and Z positions of each enhanced dot in a common coordinate system at the time of each snapshot. From the position information and the known data, the external computing circuits are able to calculate the clubhead velocity and spin (or rotation) in three dimensions during the immediate preimpact ball 8 launch time period which pre impact condition is determined by calculation based on data from clubhead positions A and B data and the known position of stationery ball 8 from position B. In addition, the path direction, attack angle, and hit location are calculable from the positional information provided by the three reflective dots 30*u,v,y* on club unit 7.

As a golfer swings clubhead unit 7 through field 35, the system electronic images are seen through the cameras 18, 19 as shown on panels 18*a*, 19*a* in FIG. 8. The right hand field of view of camera 18 will differ slightly from the left hand field of view of camera 19 due to the 20° angle difference in camera orientation. The resulting equations to be solved given the camera coordinates, $U_i^j$, $V_i^{(j)}$ for the three club dots, i, and two cameras J are as follows:

$$U_i^j = \frac{D_{1j}X(i) + D_{2j}Y(i) + D_{3j}Z(i) + D_{4j}}{D_{9j}X(i) + D_{10j}Y(i) + D_{11j}Z(i) + 1}$$

$$i = 1, 3; j = 1, 2$$

$$V_i^j = \frac{D_{5j}X(i) + D_{6j}Y(i) + D_{7j}Z(i) + D_{8j}}{D_{9j}X(i) + D_{10j}Y(i) + D_{11j}Z(i) + 1}$$

With the known coordinates X(i), Y(i), Z(i) i=1, 3 for the club head unit 7 in position A, computer 5 further analyzes the positions of X(i), Y(i), Z(i), i=1, 3 at the second position B in FIG. 5. In addition, the electronic image contains the location of six dots 25*g–l* on golf ball 8. The triangulation from the data of cameras 18, 19 allows us to locate the position of six dots 25*g–l* on the surface of the ball. With information as to the six dots 25*g–l* on the surface and radius of ball 8, the center of ball 8, Xc, Yc, Zc are calculated by solving the six (6) equations:

$$(X_i^B - X_c)^2 + (y_i^B - Y_c)^2 + (Z_i^B - Z_c)^2 = (\text{RADIUS})^2$$

I=1, . . . 6.

With the positional information of dots 20*a–c* on the club head unit 7 known, the location of the center of the clubface 7*f* ($C_x$, $C_y$, $C_z$) and its local coordinate system are found at the two strobed position A and B prior to impact with the ball 8 through the club calibration procedure previously described. The velocity components of the center of clubface unit 7 along the three axis of the coordinate system are then computed from the formulas:

$$V_x = \frac{Cx(t + Dt) - Cx(t)}{Dt}$$

$$V_y = \frac{Cy(t + Dt) - Cy(t)}{Dt}$$

$$V_z = \frac{Cz(t + Dt) - Cz(t)}{Dt}$$

in which Dt is the time interval between strobe firings.

The clubhead spin components result from the matrix of direction cosines relating the orientations of dots 20*a–c* on the clubhead unit 7 in one orientation to those in the second orientation. If we denote this matrix by A with elements Aij (i=1,3; j=1,3) then the magnitude, θ, of the angle of rotation vector of the two clubhead orientations during the time increment Dt is given by:

$$\theta = \sin^{-1}\frac{(R)}{2}$$

wherein $R = \sqrt{[L^2 + M^2 + N^2]}$ $L = A_{32} - A_{23}$
$M = A_{13} - A_{31}$
$N = A_{21} - A_{12}$ The three orthogonal components of spin rate Wx, Wy, Wz are given by:

Wx=θL/(RDt)

Wy=θM/(Rdt)

Wz=θN/(Rdt)

From calculating the distance between the center of ball 8 and the center of the clubface 7*f* minus the radius of ball 8 and the velocity of the center of club face 7*f*, the time is calculated that it would take the last position of the clubface 7*f* to contact the surface of ball 8. Knowing this time, the position of the three clubhead unit 7 dots 20*a–c* can be calculated assuming the velocity of face 7*f* remains constant up until it reaches position C when impacting ball 8. With these club face 7*f* positions calculated at impact, the position of ball 8 relative to the center of the club face 7*f* can be calculated by finding the point of intersection of a line through the center of ball 8 and the normal to club face 7*f* plane found by using the three extrapolated club face points 31*a–c*.

The path angle and attack angle are found from the components of velocity measured at the center of the face ($V_x$, $V_y$, $V_z$). They are defined as follows:

Path Angle=$\tan^{-1}$ ($V_x/V_z$)

Attack Angle=$\tan^{-1}$ ($V_y/\sqrt{[V_x^2+V_z^2]}$)

With the automatic location of club velocity, path angle, attack angle and face hit location, the golfer receives quantitative information on his swing for teaching and club fitting purposes. In addition, the direction of the clubface plane can be calculated at impact.

EXAMPLE

After calibration as described above a golfer swung a driver through field 35 striking balls 8 in two successive series of five (5) shots per series. The following data was obtained for the first series:

| Type of Measurement | Average of Five Shots | Standard Deviation |
|---|---|---|
| Clubhead speed perpendicular to intended line of flight of ball | 1.7 mph | 0.80 |
| Clubhead speed in vertical direction | −0.2 mph | 2.25 |
| Clubhead speed in intended line of flight | 81.8 mph | 5.02 |
| Clubhead spin rate around axis perpendicular to intended line of flight | −18 rpm | 77 |
| Clubhead spin rate around vertical axis | 343 rpm | 39 |
| Clubhead spin rate around intended line of flight as axis | 41 rpm | 18 |
| Location of impact horizontal from geometric center of club face (minus indicates toward toe and plus toward heel) | +0.35 inches | 0.245 |
| Distance vertically from geometric center of club face (minus is below and plus above) | −0.47 inches | 0.360 |
| Path Angle | −1.2° | .059 |
| Attack Angle | −0.1° | 1.52 |
| Loft Angle | 15.3° | 2.35 |
| Open Angle | 10.2° | 2.12 |

Based on the above information the golfer is advised to swing the golf club lower and to close the golf club face sooner before impact.

In a second series of shots the following data was obtained:

| Type of Measurement | Average of Five Shots | Standard Deviation |
|---|---|---|
| Clubhead speed perpendicular to intended line of flight of ball | 3.7 mph | 2.74 |
| Clubhead speed in vertical direction | 1.5 mph | 0.56 |
| Clubhead speed in intended line of flight | 85.0 mph | 1.43 |
| Clubhead spin rate around axis perpendicular to intended line of flight | −32 rpm | 134 |
| Clubhead spin rate around vertical axis | 359 rpm | 52 |
| Clubhead spin rate around intended line of flight as axis | 45 rpm | 66 |
| Location of impact horizontal from geometric center of club face (minus indicates toward toe and plus toward heel) | −.35 inches | 0.527 |
| Distance vertically from geometric center of club face (minus is below and plus above) | +0.22 inches | 0.309 |
| Path Angle | −2.5° | 1.80 |
| Attack Angle | 1.0° | 0.37 |
| Loft angle | 14.0° | 3.61 |
| Open Angle | 7.2° | 3.17 |

I claim:

1. A monitoring system for analyzing the movement of a striking instrument and an object in a three dimensional field of view, the system comprising:

first and second cameras directed toward the three dimensional field of view;

a control operative to activate the first and second cameras during movement of the instrument through the field of view;

a shuttering system connected with the control and operative to provide light to the cameras at predetermined intervals during movement of the instrument through the field of view; and a light sensor associated with each camera and connected with the control for receiving light reflected from the object and the instrument;

wherein the control discriminates between light reflected from the object and light reflected from the instrument to determine the speed, orientation and path of the instrument in the field of view.

2. The monitoring system of claim 1 wherein the control further includes a motion detector for sensing movement of the instrument into the field of view.

3. The monitoring system of claim 1 wherein the shuttering system further includes a light strobing unit.

4. The monitoring system of claim 1 wherein the shuttering system further includes a constant light source.

5. The monitoring system of claim 1 wherein the first and second cameras are mounted on a support structure slidably engaged to a track.

6. The monitoring system of claim 1 wherein the first and second cameras are angled toward each other.

7. A system for monitoring a sports object, such as a ball or striking instrument, as the object moves through a three dimensional field of view adjacent the object, the system comprising:

first and second cameras oriented toward each other at an angle of less than 30° and directed toward the three dimensional field of view;

a control operative to activate the first and second cameras during movement of the object through the field of view;

a shuttering system connected with the control and operative to provide light to the cameras at predetermined intervals during movement of the instrument through the field of view; and a light sensor associated with each camera and connected with the control for emitting signals in response to light reflected from the object;

wherein the control converts the signals from the light sensor into three dimensional positional data of the object corresponding to at least two different positions of the object in the field of view.

8. The monitoring system of claim 7 wherein the control further includes a motion detector for sensing movement of the instrument into the field of view.

9. The monitoring system of claim 7 wherein the shuttering system further includes a light strobing unit.

10. The monitoring system of claim 7 wherein the shuttering system further includes a constant light source.

11. The monitoring system of claim 7 wherein the first and second cameras are mounted on a support structure slidably engaged to a track.

12. The monitoring system of claim 7 wherein the first and second cameras are angled toward each other.

13. The monitoring system of claim 7 wherein the cameras are oriented toward each other at an angle between 10° and 30°.

14. The monitoring system of claim 7 wherein the cameras are oriented toward each other at an angle of 22°.

15. A system for monitoring a striking instrument used to deliver an impact to an object as the instrument moves through a three dimensional field of view adjacent the object, the system comprising:

first and second cameras directed toward the three dimensional field of view;

a control operative to activate the first and second cameras during movement of the instrument through the field of view;

a shuttering system connected with the control and operative to provide light to the cameras at predetermined intervals during movement of the instrument through the field of view; and a light sensor associated with each camera and connected with the control for emitting signals in response to light reflected from the object and the instrument;

wherein the control triangulates positional data sent from each camera unit based on light reflected from the object and the instrument and outputs data on the relative positions of the object and the instrument.

16. The monitoring system of claim 15 wherein the control further includes a motion detector for sensing movement of the instrument into the field of view.

17. The monitoring system of claim 15 wherein the shuttering system further includes a light strobing unit.

18. The monitoring system of claim 15 wherein the shuttering system further includes a constant light source.

19. The monitoring system of claim 15 wherein the first and second cameras are mounted on a support structure slidably engaged to a track.

20. The monitoring system of claim 15 wherein the first and second cameras are angled toward each other.

21. A method of measuring speed, direction and orientation of a striking instrument as the instrument moves through a field of view to strike an object, the method comprising the steps of:

attaching a calibration fixture to the striking instrument;

determining a control position of the striking instrument in a field of view while the striking instrument is attached to the calibration fixture;

removing the calibration fixture;

moving the striking instrument through the field of view to strike the object;

determining a swing position of the striking instrument during movement through the field of view; and comparing the swing position with the control position while measuring the speed, orientation and direction of the instrument.

22. The method of claim 21 wherein the step of determining the control position further includes detecting illuminal areas on the striking instrument and fixture.

23. The method of claim 22 wherein the striking instrument includes at least three illuminal areas.

24. The method of claim 23 wherein the fixture includes at least three illuminal areas.

25. A monitoring system for analyzing the movement of at least one of a striking instrument and an object in a three dimensional field of view, the system comprising:

a camera mounted on a support and directed toward the field of view;

a control operative to activate the camera during movement of the instrument through the field of view;

a shuttering system connected with the control and operative to provide light to the cameras a predetermined intervals during movement of the instrument through the field of view; and a track operatively connectable with the support for allowing movement of the support and a corresponding movement of the field of view.

26. The system of claim 25 wherein the support includes a guide member and the track comprises a rod along which the guide member rides.

27. The system of claim 26 wherein the track comprises a pair of rods and the support includes front and rear guide member for respectively riding along the pair of rods.

28. The system of claim 25 further including another camera mounted to the support and operated by the control.

29. The system of claim 28 wherein the cameras are angled toward each other and toward the field of view.

* * * * *